Aug. 7, 1928.
C. L. SHOBE
VEHICLE TOP BRACE
Filed June 11, 1926
1,679,688
2 Sheets-Sheet 1
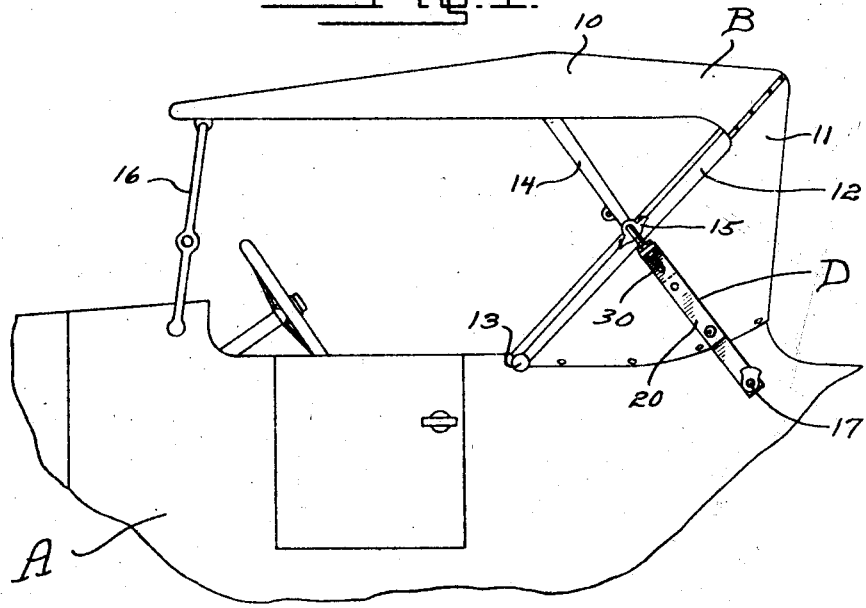
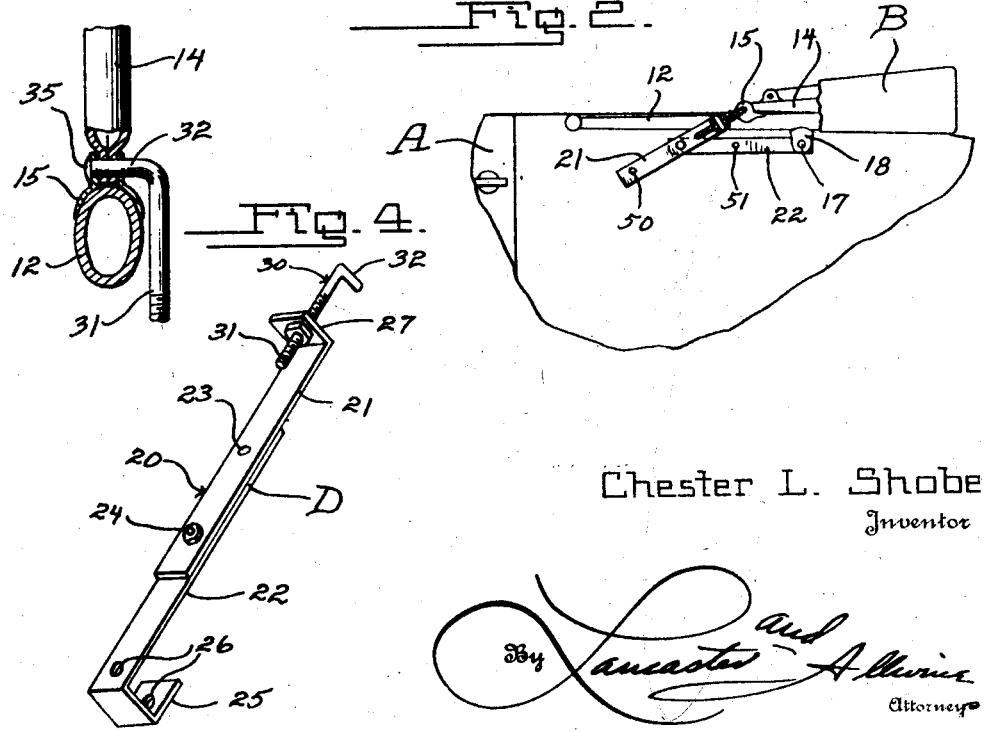
Chester L. Shobe
Inventor
By Lancaster and Allwine
Attorneys Aug. 7, 1928.
C. L. SHOBE
VEHICLE TOP BRACE
Filed June 11, 1926
1,679,688
2 Sheets-Sheet 2
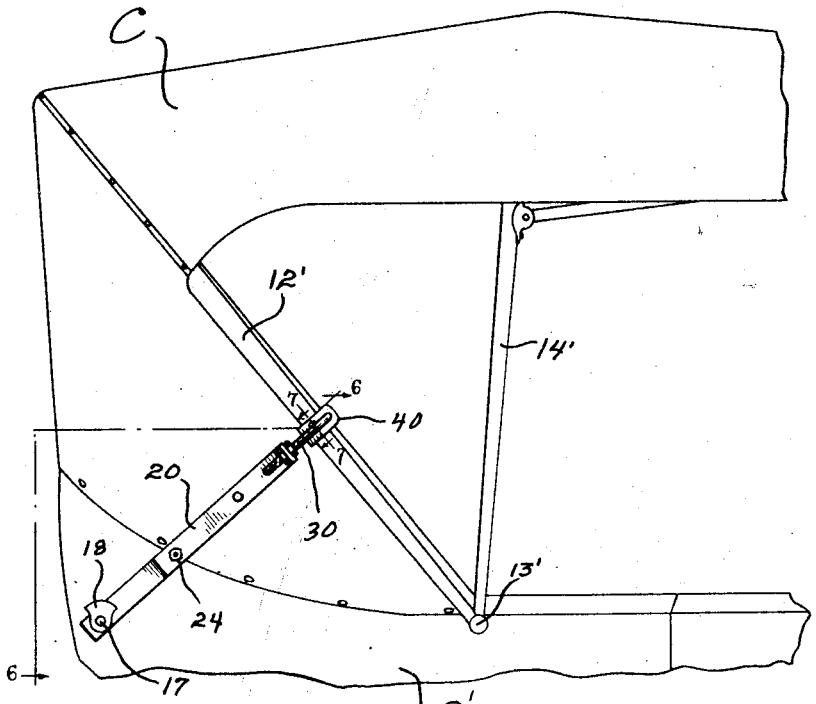
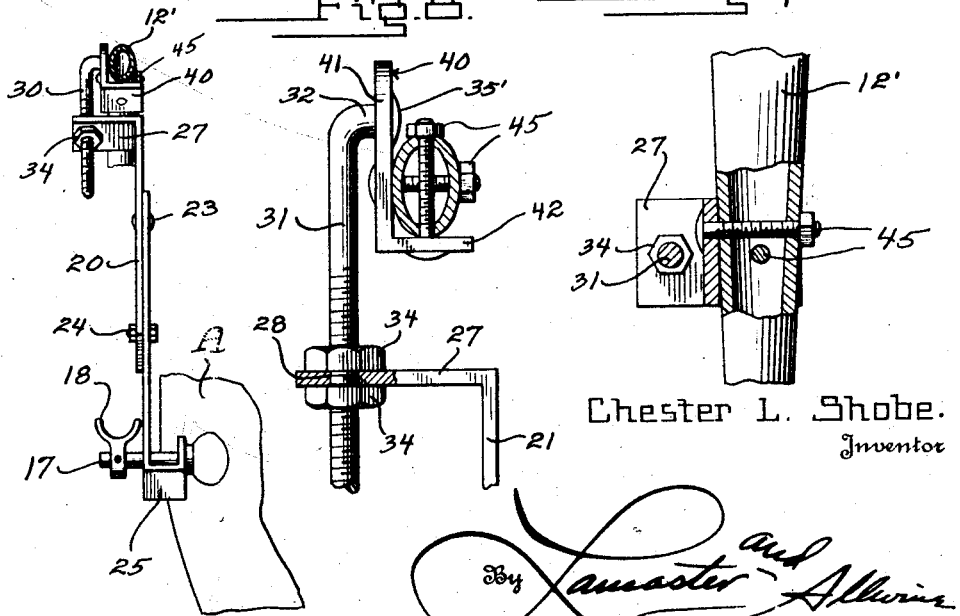
Chester L. Shobe.
Inventor Patented Aug. 7, 1928.

1,679,688

UNITED STATES PATENT OFFICE.

CHESTER L. SHOBE, OF PERU, KANSAS.

VEHICLE TOP BRACE.

Application filed June 11, 1926. Serial No. 115,320.

The present invention relates primarily to vehicle tops and more specifically to an improved bracing means for conventional types of tops for open styles or models of motor vehicles.

In certain types of motor vehicles, the front part of the top is supported by the windshield bracket or frame, and this attachment of the front portion of the top to the windshield, is relied upon to keep the top in proper position against forward and rearward shifting, and this attachment of the top to the windshield is also utilized for maintaining the top covering in a taut condition. In service, this construction allows the top covering and particularly the back curtain to become loose due to rearward movement of the top which renders the back curtain unsightly in appearance. This construction also places a considerable strain upon the windshield, particularly when the vehicle is in motion, and quite frequently results in the springing of the windshield frame.

It is therefore a primary object of this invention to provide an improved bracing means for such collapsible types of tops whereby rearward strain upon the windshield frame is eliminated, and which bracing means also serves for maintaining the rear curtain of the top in a taut condition.

A further object of the invention is to provide a brace attachment for vehicle tops which may be readily applied to existing types of tops, the brace being adapted for attachment at one end to the usual rest pin for the top, and at its opposite end with the rear bow of the top.

A further object of the invention is to provide an improved top brace embodying adjustable features which render the brace applicable to various makes and models of collapsible tops for open cars.

A still further object of the invention is to provide an improved top brace for collapsible top structures, embodying features whereby the same may be caused to fold when the top structure is folded or lowered, thus allowing the brace to serve as a permanent fixture after initial application to the vehicle.

A still further object of the invention is to provide an improved vehicle top brace which is extremely simple yet durable in construction, and which may be readily applied to existing types of collapsible tops without departing from the general appearance of the conventional type of vehicle tops.

Other objects and advantages of the invention will be apparent during the course of the following detailed description, taken in connection with the accompanying drawings, forming a part of this specification and in which drawings—

Figure 1 is a fragmentary side elevation of a portion of a motor vehicle, and showing one of the improved braces in position for maintaining the top structure in a proper raised position.

Figure 2 is a fragmentary side view of a vehicle and showing the brace collapsed when the top structure is folded or lowered.

Figure 3 is an enlarged fragmentary sectional view showing the manner of attaching the upper end of the brace to the bow structure of the top.

Figure 4 is a perspective view of the improved brace.

Figure 5 is a fragmentary side elevation of the upper rear portion of a motor vehicle, and showing the improved brace applied to a top of slightly different construction from that shown in Figure 1.

Figure 6 is an enlarged rear view of the brace as shown applied in Figure 5, the view being one taken substantially at line 6—6 of Figure 5 and looking forwardly or in the direction of the arrows.

Figure 7 is an enlarged fragmentary section on line 7—7 of Figure 5 and showing the manner of attaching the brace to a top construction as illustrated in Figure 5.

Figure 8 is an enlarged fragmentary view of the upper end of one of the braces and showing the manner of attachment to that type of top construction as illustrated in Figure 5.

Referring to the drawings in detail, and wherein similar reference characters designate corresponding parts throughout the several views, the letters A and A' designate conventional types of motor vehicle bodies shown embodying top constructions B and C respectively of slightly differing constructions, the top B being illustrated as a top construction for a vehicle of the roadster type, and the top construction C being illustrated for a vehicle of the touring type. The letter D designates generally the improved brace and which is readily applicable to either of the types of constructions B or C.

Referring particularly to the vehicle construction as illustrated in Figure 1, the top B comprises a covering embodying a roof portion 10 and a rear portion or curtain 11, the covering being supported at its rear portion by the usual rearwardly and upwardly inclined rear bow 12 which is pivotally connected at its lower end to the vehicle body A as at 13. With this type of top construction B, an intermediate or stay bow 14 is pivotally connected by its side arms to the intermediate portion of the side arms of the rear bow 12 by a suitable hinge member 15. This bow 14 serves as a support for the intermediate portion of the roof portion 10. The forward portion of the top structure B is connected to the upper end of the windshield frame 16, the windshield being supported upon the vehicle body A. As will be observed, with this construction wherein the top B is connected to the upper end of the windshield frame 16, the windshield frame is relied upon for supporting the top structure at its forward portion and maintaining the rear curtain or portion 11 in a taut condition. The body A is provided with the usual projection or pin 17 upon which is mounted a rest 18 for receiving the bows of the top construction when lowered into a folded or collapsed position. This pin 17 is utilized for pivotally mounting the lower end of the brace D. With the top construction B, the usual rivet which serves as a pivotal connection for the bows 12 and 14 is removed and this provides means for pivotal connection of the upper end of the brace D with the top construction.

Referring now to the improved extensible and collapsible brace D, the same comprises an elongated body portion 20 embodying an upper section 21 and a lower section 22. These sections 21 and 22, which are preferably formed from strap iron of a suitable gage, are connected together in longitudinal alignment at two points by a rivet or hinge point 23 and by a removable bolt and nut 24. The rivet or pivot member 23 preferably extends through the upper end of the lower section 22 and the intermediate portion of the upper section 21, while the removable bolt and nut 24 extends through the lower portion of the upper section 21 and the intermediate portion of the lower section 22. This rivet 23 and bolt 24 provide means for maintaining the sections 21 and 22 in longitudinal alignment when the brace is in its operative position, and upon removal of the bolt 24 allows the sections to break or pivot about the rivet 23 when the top B is in its lowered or collapsed position as illustrated in Figure 2. The lower end of the section 22 is bent into U shaped formation as at 25 and provided with aligning apertures 26 for sliding the U shaped lower end 25 over the projection or pin 17 which serves as a support for the top structure when lowered. The rest 18 may be removed from the pin 17 when positioning the lower end of the section 22 over the pin, after which the rest will serve for preventing movement of the section off the pin. The upper end of the section 21 is bent at a right angle as at 27 for providing a wing at the upper end of the section. The wing 27, which is apertured at 28, is adapted to carry an extension member 30 for connection with the top construction B.

This extension member 30 preferably consists of a rod bent into L shaped formation for providing a relatively long shank portion 31 and a right angularly extending pivot arm 32. The shank portion 31 is threaded throughout the greater portion of its length and is adapted to pass through the aperture 28 of the wing 27, with binding nuts 34 threaded upon the shank above and below the wing for binding engagement with opposite faces of the wing. Thus it will be seen that upon turning of the binding nuts 34, that the extension member may be adjusted longitudinally of the body portion 20. The pivot arm 32 is adapted to be passed through the hinge member 15 and apertured lower end of the stay bow 14 upon removal of the usual rivet which pivotally connects the bow 14 to the rear bow 12. The pivot arm 32 preferably extends through the hinge member 15 from the outer side of the bow 12, and may have its end portion upset as at 35 for preventing withdrawal of the arm from the member 15. Thus it will be seen that the brace D is pivotally connected at its lower end to the vehicle body A, and at its upper end to the bows of the top construction B.

With reference to the form of top construction C as illustrated in Figure 5, and wherein the intermediate or stay bow 14' is pivotally connected at the pivotal connection for the rear bow 12', and L shaped attaching bracket 40 is provided for pivotal connection of the upper end of the brace with the bow 12'. This L shaped attaching bracket 40 is provided because of the fact that with this type of bow construction the hinge member such as shown at 15 in Figure 1 is not provided along the arms of the bow for pivotal connection of one end of the bow 14'. The bracket 40 is positioned with its longer arm 41 at the outer side of the bow 12', and has its shorter arm 42 extending below the bow with a bolt 45 extending through each of the arms 41 and 42 and through the bow for rigidly connecting the bracket to the bow. The upper end of the arm 41 may be apertured for pivotally receiving the pivot arm 32, which arm may have its end upset such as at 35' for preventing withdrawal of the arm from the attaching bracket.

It will be observed that in each instance, the brace D tends to force the rear bow forwardly, thus relieving the strain upon the windshield frame 16 and maintaining the rear portion or curtain 11 of the covering in a taut condition. It will also be observed that upon adjustment of the extension member 30 longitudinally of the connected link sections 21 and 22, that the rear bow may be swung about its pivotal connection with the vehicle body. This extension member 30 also renders the brace applicable to various makes and models of open cars wherein the top supporting pins are arranged at various distances rearwardly of the pivot point for the top construction.

In use, and when it is desired to lower the vehicle top, the bolt 24 is first removed, whereupon the sections 21 and 22 may fold upon the pivot connection 23 into a position as illustrated in Figure 2, and when it is desired to raise the top, the apertures 50 and 51 of the sections 21 and 22 respectively, are first brought into alignment whereupon the bolt 24 may be passed through the apertures for locking the sections in longitudinal alignment for bracing the top construction.

With the type of top construction as illustrated in Figure 1, it will be seen that the brace D also relieves strain upon the intermediate portion of the rear bow 12, from the rearward pressure of the intermediate bow 14.

From the foregoing description it will be apparent that a novel collapsible and extensible brace for vehicle tops has been provided whereby strain upon the windshield frame has been eliminated, and permitting the covering for the top to be maintained in a taut condition.

It is to be understood that two of the braces D are provided for each top construction, the braces being identical and arranged one at each side of the vehicle.

Changes in detail may be made to the specific forms of the invention herein shown and described, without departing from the spirit of the invention or the scope of the following claims.

I claim:

1. In combination with a vehicle embodying a body, and a top construction embodying a rear bow having its arms pivotally connected to the body and a stay bow for pivotal connection with the intermediate portion of the arm of said rear bow, of a brace for the top construction pivotally connected at one end to the body rearwardly of the pivotal connection of the rear bow arms and having a right angular pivot arm at its opposite end serving to pivotally connect the rear and stay bow.

2. A vehicle top brace comprising a main body portion embodying pivotally connected upper and lower sections, said upper section being provided at its upper end with an apertured wing and said lower section provided at its lower end with an apertured U portion, means for releasably retaining the upper and lower sections in longitudinal alignment, and an extension member carried by the wing of the upper section and embodying a pivot arm adjustable longitudinally of the main body portion.

3. A vehicle top brace comprising a main body portion embodying pivotally connected upper and lower sections, said upper section provided with an apertured wing and the lower section with an apertured U portion, said sections also having apertures for aligning when the sections are in longitudinal alignment, a bolt passing through the aligning apertures of the sections for releasably retaining the sections in alignment, and an extension member fitting in the aperture of said wing and adjustable longitudinally of the main body portion.

CHESTER L. SHOBE.